(12) United States Patent
Yim

(10) Patent No.: US 6,373,689 B1
(45) Date of Patent: Apr. 16, 2002

(54) DISPLAY CONNECTOR FOR ELECTRONIC DEVICE

(75) Inventor: Hong-kyun Yim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/725,685

(22) Filed: Nov. 30, 2000

(30) Foreign Application Priority Data

Apr. 29, 2000 (KR) ........................................ 2000-23102

(51) Int. Cl.$^7$ ................................................ H05K 7/14
(52) U.S. Cl. ........................ 361/681; 361/680; 361/682; 361/683; 439/136; 439/137; 364/708.1
(58) Field of Search ................................ 361/681, 680, 361/682, 683; 439/136, 137, 164; D14/100, 106, 114.1; 364/708.1; 403/78, 325–327

(56) References Cited

U.S. PATENT DOCUMENTS

| | | | | |
|---|---|---|---|---|
| 4,749,364 A | * | 6/1988 | Arney et al. | 361/681 |
| 5,168,429 A | * | 12/1992 | Hosoi | 361/680 |
| 5,193,069 A | * | 3/1993 | Furuya | 364/708 |
| 5,253,139 A | * | 10/1993 | Satou | 361/681 |
| 5,583,529 A | * | 12/1996 | Satou | 345/87 |
| 5,796,576 A | * | 8/1998 | Kim | 361/681 |
| 5,805,415 A | * | 9/1998 | Tran et al. | 361/681 |
| 6,006,243 A | * | 12/1999 | Karidis | 708/100 |

* cited by examiner

*Primary Examiner*—Leo P. Picard
*Assistant Examiner*—David Foster
(74) *Attorney, Agent, or Firm*—Sughrue Mion, PLLC

(57) ABSTRACT

A display connector including a body having a receiving portion with a predetermined depth at its one end and having input keys on its top surface, and a display member for receiving a picture signal from the body and displaying an image. A rotation bracket is rotatably and slidably installed inside the receiving portion, and rotates between a first position at which the rotation bracket protrudes to the top surface of the body during rotation and a second position at which the rotation bracket is accommodated inside the receiving portion. A hinge pin is rotatably coupled to the rotation bracket and the display member is detachably connected to the hinge pin when the rotation bracket is positioned at the first position. A position fixing mechanism is provided for fixing the position of the rotation bracket. A light emitting module is supported by the rotation bracket to be rotated with the hinge pin, and has a laser diode array for independently irradiating light according to a driving signal. A light receiving module is installed in the display member to be locked to face the light emitting module when the display member is mounted on the body, and has a photodiode array for independently performing a photoelectric conversion on incident light. The display member is detachably installed with respect to the hinge pin so as to open or close the top surface of the body when the rotation bracket is positioned at the first position, and the rotation bracket is rotated to reach the second position when the display member is disconnected from the body.

8 Claims, 8 Drawing Sheets

DISPLAY CONNECTOR FOR ELECTRONIC DEVICE

BACKGROUND OF THE INVENTION

1. Field of the Invention

The present invention relates to a display connector for an electronic device having a display member and, more particularly, to a display connector of an electronic device configured such that a display member is detachable from a body.

2. Description of the Related Art

In general, a portable electronic device having a display member, such as a notebook computer, a web video phone, a digital video camera or the like, has the display member integrally formed with a body. FIG. 1 is a perspective view of a notebook computer as an exemplary electronic device having a display member.

Referring to FIG. 1, the notebook computer includes a body 1 having a computer system and a display member 3 for displaying an image according to a picture signal from the body 1.

The body 1 includes an input device for inputting manipulation commands, such as a keyboard or a mouse, a hard disk drive, a CD-ROM, a modem, peripheral devices such as a LAN card, or an acoustic devices for providing an audio signal. The display member 3 is an output device for outputting information supplied from the body 1 in the form of an image. The display member 3 is hinged at a side of the body 1 so as to be capable of being opened or closed. Also, the display member 3 is electrically connected to the body 1 by a cable 5.

In the notebook computer having the aforementioned configuration, since the body 1 and the display member 3 are directly hinged and connected to each other by the cable 5, they are not separable. During use of the notebook computer, the body or display member thereof may become defective. Also, when the service life of the body or display member is spent, or when the display member is intended to be replaced with a new one having a large screen, the replacement of display members cannot be done directly by a user. Also, the cable is exposed outside, resulting in a bad outer appearance.

SUMMARY OF THE INVENTION

To solve the above problems, it is an objective of the present invention to provide a display connector for an electronic device configured such that a display member is detachable from a body.

Accordingly, to achieve the above objective, there is provided a display connector including a body having a receiving portion with a predetermined depth at its one end and having input keys on its top surface, a display member for receiving a picture signal from the body and displaying an image, a rotation bracket rotatably and slidably installed inside the receiving portion, and rotating between a first position at which the rotation bracket protrudes to the top surface of the body during rotation and a second position at which the rotation bracket is accommodated inside the receiving portion, a hinge pin which is rotatably coupled to the rotation bracket and to which the display member is detachably connected when the rotation bracket is positioned at the first position, a position fixing mechanism which fixes the position of the rotation bracket, a light emitting module supported by the rotation bracket to be rotated with the hinge pin, and having a laser diode array for independently irradiating light according to a driving signal, and a light receiving module installed in the display member to be locked to face the light emitting module when the display member is mounted on the body, and having a photodiode array for independently performing a photoelectric conversion on incident light, wherein the display member is detachably installed with respect to the hinge pin so as to open or close the top surface of the body when the rotation bracket is positioned at the first position, and the rotation bracket is rotated to reach the second position when the display member is disconnected from the body.

BRIEF DESCRIPTION OF THE DRAWINGS

The above objective and advantages of the present invention will become more apparent by describing in detail a preferred embodiment thereof with reference to the attached drawings, in which.

DETAILED DESCRIPTION OF THE PREFERRED EMBODIMENT

Figure 1:
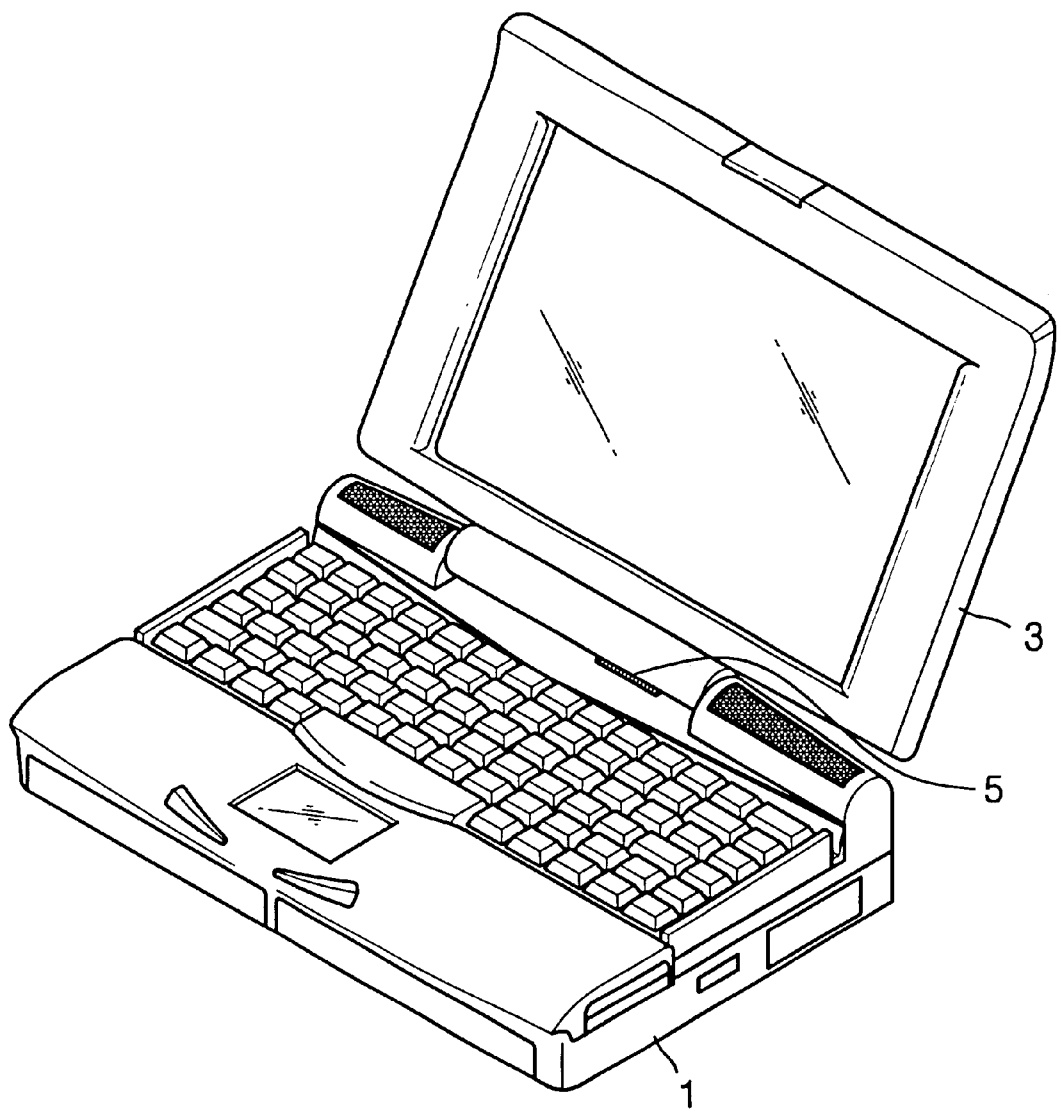
FIG. 1 is a perspective view illustrating a general notebook computer.
Figure 2:
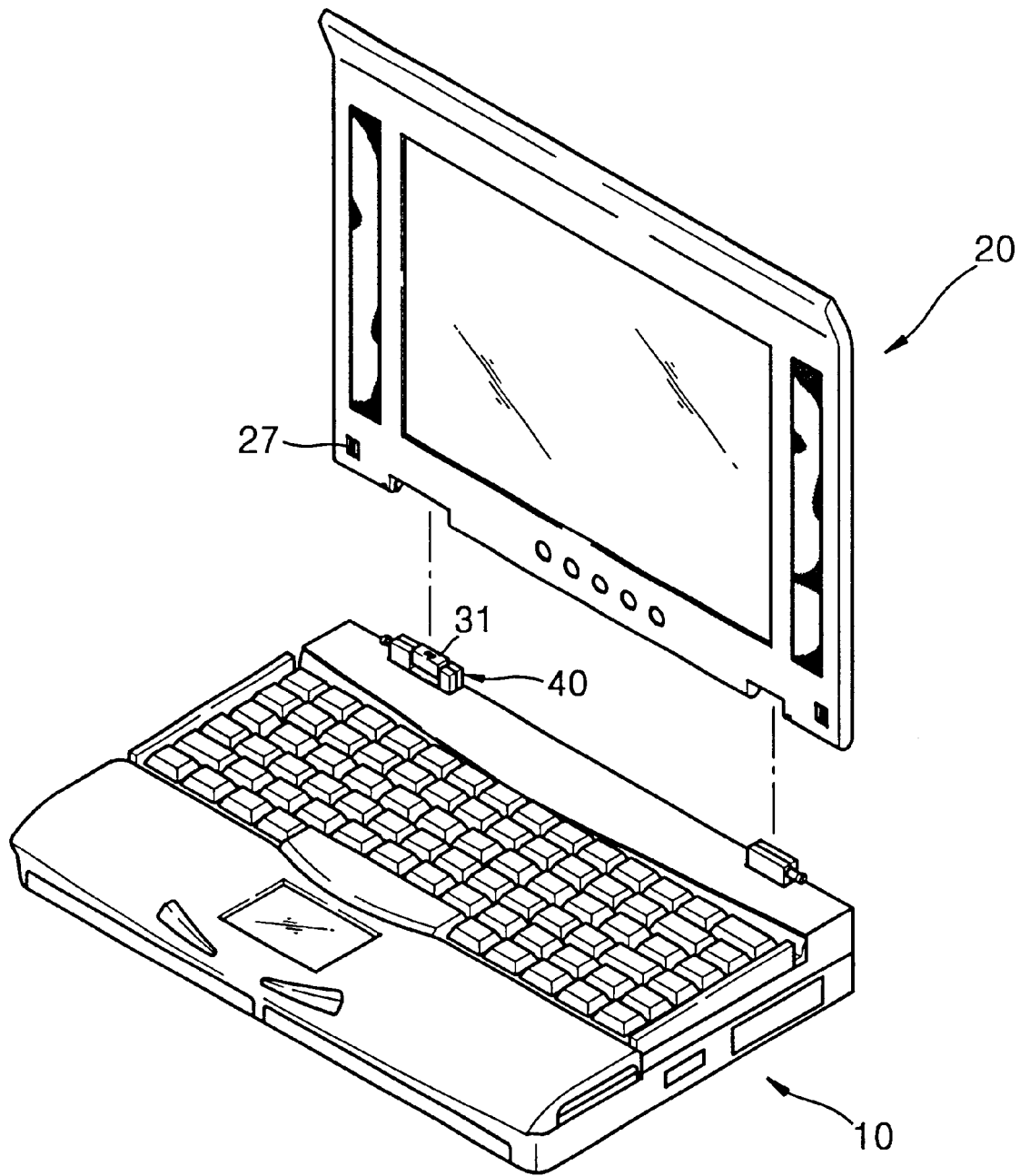
FIG. 2 is an exploded perspective view illustrating a display connector for an electronic device according to the present invention.
Figure 3:
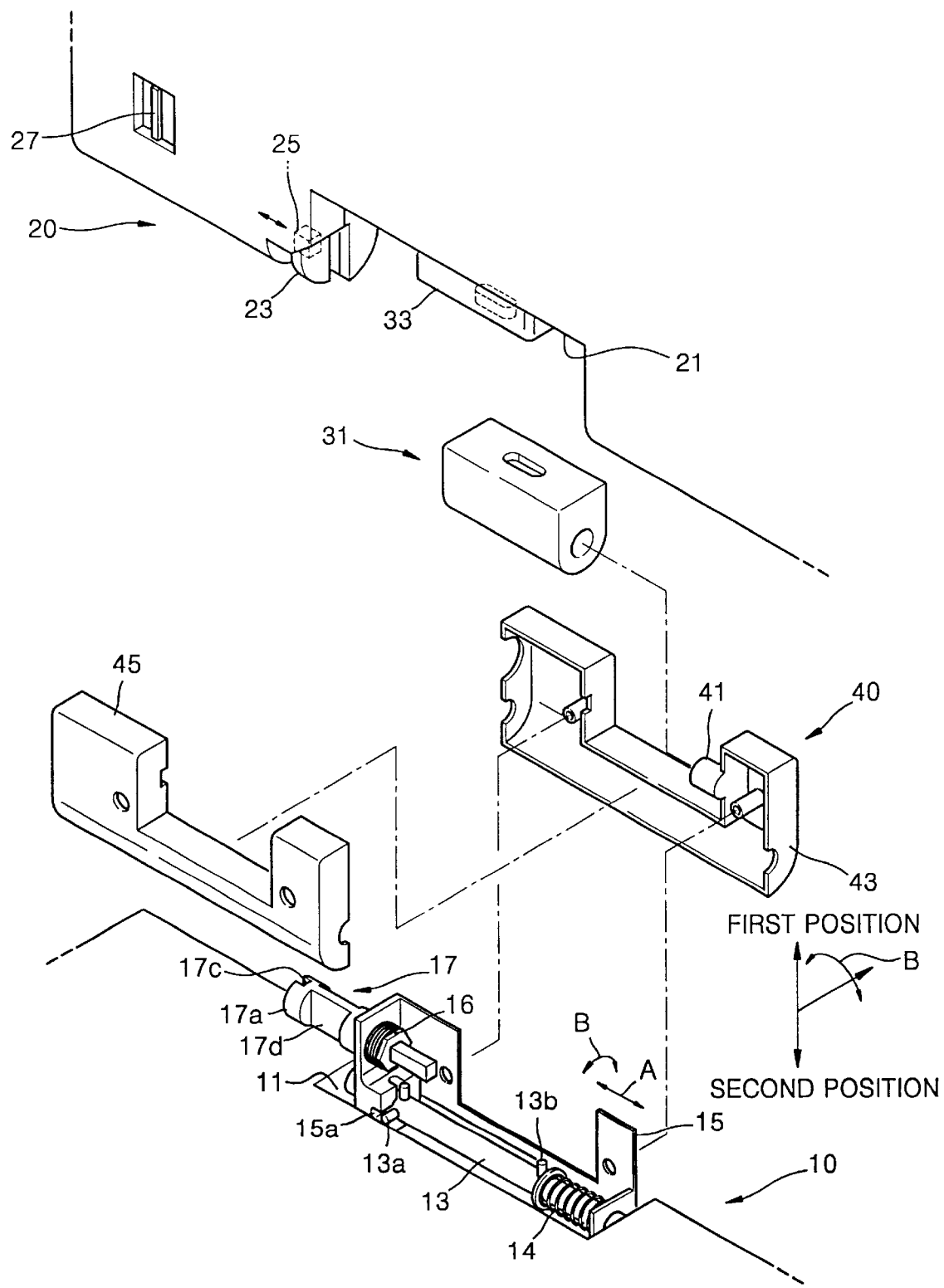
FIG. 3 is an exploded perspective view illustrating essential parts of FIG. 2.
Figure 4:
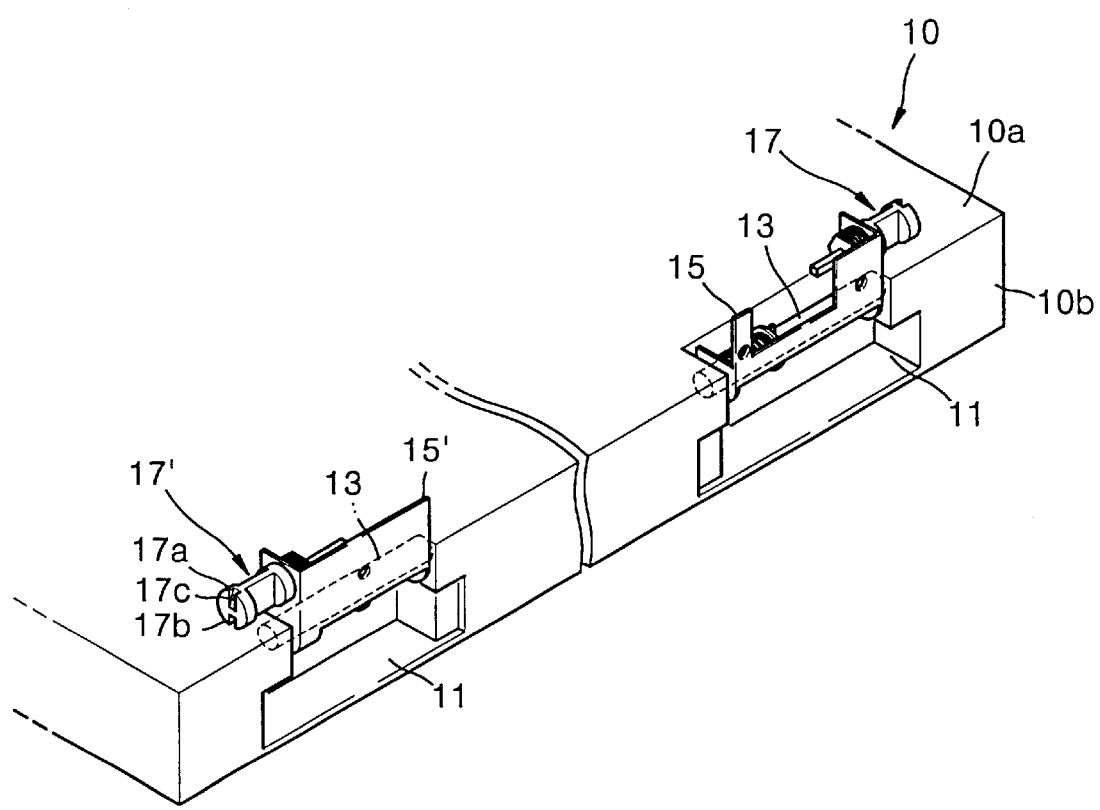
FIG. 4 is a partially extracted view illustrating a receiving portion of FIG. 2.

Referring to FIGS. 2 through 4, a display connector of an electronic device according to the present invention includes a body 10 having input keys on its top surface and receiving portions 11 of a predetermined shape recessed at one end thereof, a display member 20 for receiving a signal from the body 10 and displaying an image, support shafts 13 installed inside the receiving portions 11, rotation brackets 15 and 15' rotatably and slidably coupled to the support shafts 13, hinge pins 17 and 17' rotatably coupled to the rotation brackets 15 and 15', a position fixing mechanism for fixing the positions of the rotation brackets 15 and 15', a light emitting module 31 and a light receiving module 33.

As shown in FIG. 4, the receiving portions 11 formed in the body 10 are formed in a predetermined shape so as to be recessed from the top surface 10a of the body 10 to a sidewall 10b thereof. Also, the receiving portions 11 are provided in the body 10 to be spaced a predetermined distance apart from each other. The support shafts 13 installed inside the receiving portions 11 are fixed to traverse the internal spaces of the receiving portions 11.

The rotation bracket 15 (15') is slidably moved in an axial direction (A) of the support shaft 13 and is rotatably moved in a direction (B) (see FIG. 3). In other words, the rotation brackets 15 and 15' are rotatably movable between a first position and a second position. In this case, the first position is a position at which the rotation brackets 15 and 15' protrude at an angle of about 90° with respect to the top surface 10a of the body 10. The second position is a position at which the rotation brackets 15 and 15' rotate about 180° from the first position. Thus, the rotation brackets 15 and 15' are in a state in which they are perfectly housed within the receiving portions 11. Also, the rotation brackets 15 and 15' are fixed at the first and second positions by the position fixing mechanisms, respectively. Thus, when the rotation brackets 15 and 15' are fixed at the first position, the display member 20 can be connected to the hinge pins 17 and 17'. The body 10 can be opened or closed by rotating the coupled display member 20. Conversely, when the display member 20 is disconnected from the body 10, the rotation brackets 15 and 15' can be rotated to be housed in the receiving portions 11. Thus, the light emitting module 31 or other devices exposed in the receiving portions 11 can be protected.

Also, friction members 16 are installed on the hinge pins 17 and 17' connected to the rotation brackets 15 and 15'. Thus, the hinge pins 17 and 17' are rotated only by an external force having a predetermined magnitude due to a frictional force of the friction members 16. Also, a locking groove 17b and a tilt plane 17c are formed in a cylindrical head 17a provided at one end of each of the hinge pins 17 and 17'. The locking groove 17b is locked with a locking pin 25 to be described later, and the tilt plane 17c guides the slidable connection of the locking pin 25. Also, a non-circular engagement portion 17d is formed at a predetermined portion adjacent to the head 17a of each of the hinge pins 17 and 17'. The engagement portion 17d is engaged with a connection bracket 23 to be described later. The other end of either hinge pin 17 or 17' has a non-circular cross-section so as to constrict rotation of the light emitting module 31. Also, the light emitting module 31 is installed at only one of the rotation brackets 15 and 15'.

The position fixing mechanism is installed at or around the rotation brackets 15 and 15' with the same configuration. For the convenience of explanation, the position fixing mechanism will be described with reference to FIG. 3. The position fixing mechanism includes a position fixing pin 13a protruding around the outer circumference of the support shaft 13 and a spring 14 installed on the support shaft 13. A plurality of the position fixing pins 13a are installed along the outer circumference of the support shaft 13 at a constant interval. Each position fixing pin 13a is selectively locked with a corresponding position fixing hole 15a formed in the rotation bracket 15. When the rotation bracket 15 is positioned at the first and second positions, a plurality of the position fixing holes 15a are installed to correspond respectively to the position fixing pins 13a at a uniformly angular distance. Preferably, at least three position fixing holes 15a are formed at intervals of about 90°. Then, the rotation bracket 15 can be fixed in the middle of the first and second positions, that is, at a horizontal position. The spring 14 elastically presses the rotation bracket 15 so as to maintain a state in which the position fixing pin 13a is inserted into the position fixing hole 15a. The spring 14 is brought into contact with a support pin 13b provided at a predetermined position of the support shaft 13, thereby being restricted in its movement.

The light emitting module 31 has one end fixed to the hinge pin 17 and the other end rotatably installed at a shaft portion 41 of a case 40 to be described later. Thus, the light emitting module 31 is constricted by the hinge pin 17 to then be rotated therewith. As is generally known, the light emitting module 31 may include a laser diode array (not shown) for independently irradiating light according to a driving signal, and an electrode terminal (not shown).

The light receiving module 33 is installed at a connection portion 21 recessed at one end of the display member 20 with a predetermined shape. In this case, the connection portion 21 accommodates the rotation bracket 15 and the light emitting module 31 when the display member 20 and the body are connected. The light receiving module 33 may include a photodiode array (not shown) for receiving light irradiated from the laser diode array, and an electrode terminal (not shown). As is generally known, the photodiode array includes a plurality of photodiodes for independently performing photoelectric conversion on incident light.

The connection bracket 23 engaged with the engagement portion 17c of the hinge pin 17 is installed at one side of the connection portion 21 of the display member 20. While the display member 20 and the body 10 are connected, the connection bracket 23 is fixed by being connected to the hinge pin 17.

Also, the connection of the connection bracket 23 and the hinge pin 17 is maintained by a locking mechanism, and the disconnection thereof is performed by an unlocking mechanism.

The locking mechanism includes a locking pin 25 corresponding to the locking groove (17b of FIG. 4). The locking pin 25 is movably installed in the vicinity of the engagement bracket 23. When the body 10 and the display member 20 are connected, the locking pin 25 is guided along the tilt plane 17c to be coupled to the locking groove 17b. The locking pin 25 is elastically pressed by an elastic member (not shown) in a direction in which it is coupled to the locking groove 17b.

The unlocking mechanism includes an unlocking lever 27 installed in the display member 20. The unlocking lever 27 is connected to the locking pin 25. Thus, the unlocking lever 27 is elastically pressed by the elastic member in the same direction with the locking pin 25. Thus, if the unlocking lever 27 is pushed in a direction opposite to the direction pressed by the elastic member, the locking pin 25 is separated from the locking groove 17b.

Also, the rotation bracket 15 is covered by a case 40. The case 40 includes a pair of front and rear case members 43 and 45. The front and rear case members 43 and 45 are connected to each other by fastening means (not shown), such as a bolt, with the rotation bracket 15 interposed therebetween. Like the rotation bracket 15, the case 40 has a predetermined shape so as to accommodate the light emitting module 31.

Figure 5:
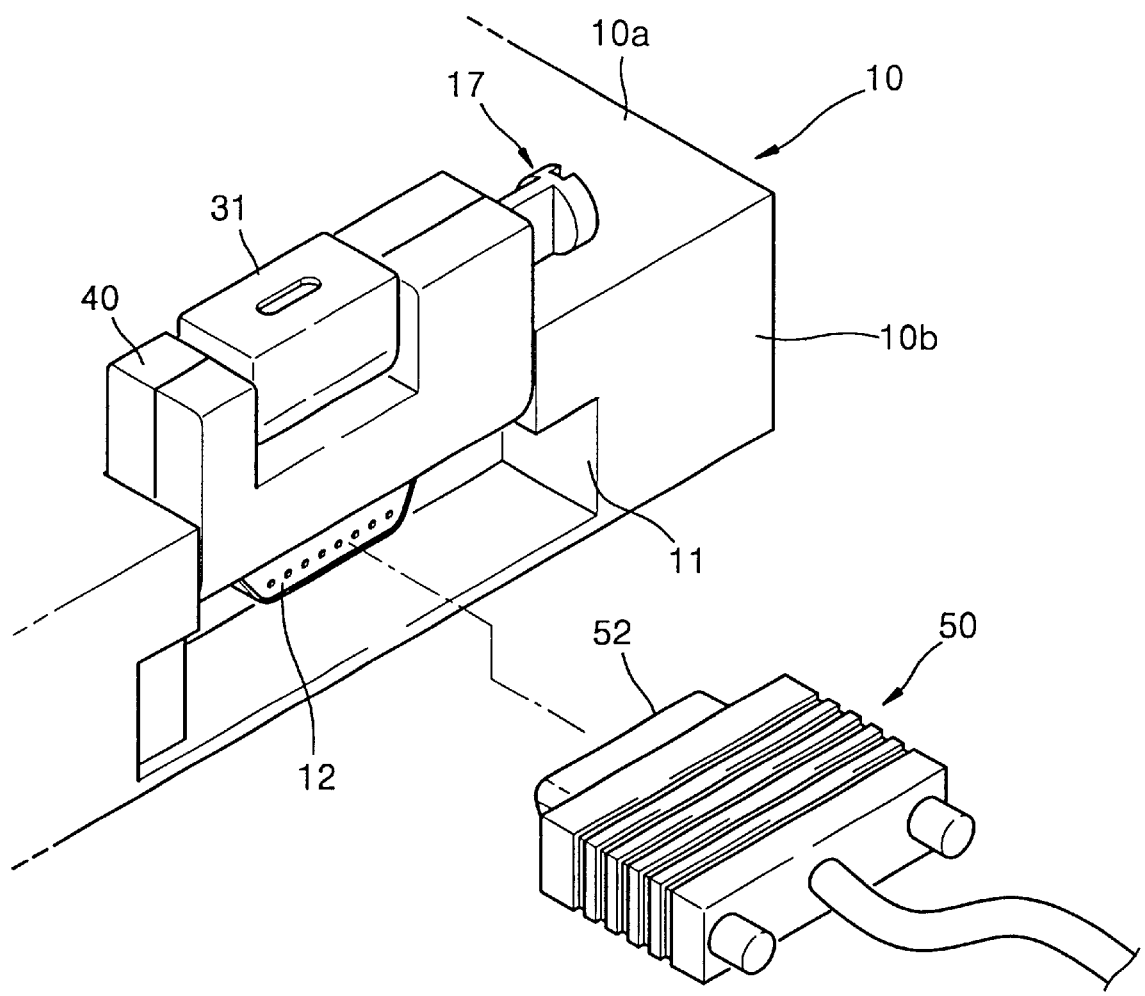
FIG. 5 is a partial perspective view illustrating an example in which a transmission terminal is provided in the receiving portion of a body.

In a state in which the body 10 and the display member 20 are disconnected, that is, when the display member 20 is away from the body 10, it is necessary to connect the body 10 and the display member 20 so that signal transmission therebetween is possible. To this end, as shown in FIG. 5, a transmission terminal 12 is preferably installed in the receiving portion 11 of the body 10. The transmission terminal 12 may be connected to the input terminal 52 of a predetermined connector 50 for signal transmission.

The display connector of an electronic device having the aforementioned configuration operates as follows.

First, in order to disconnect the display member 20 from the body 10, the unlocking lever 27 is pushed out to one side. Then, the locking pin (25 of FIG. 3) is separated from the locking groove (17b of FIG. 4). If the display member 20 is separated from the body 20 in such a state, as shown in FIG. 2, the display member 20 is disconnected.

Figure 6:
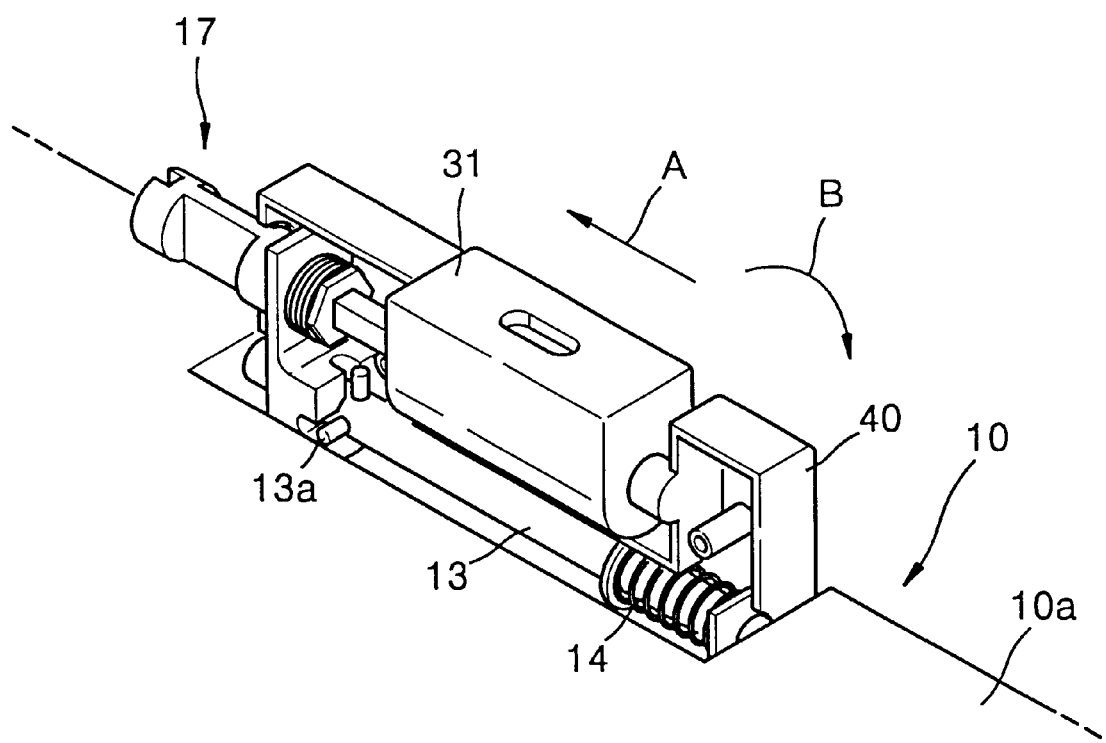
FIG. 6 is a partial perspective view illustrating a state in which a rotation bracket is positioned at a first position.
Figure 7:
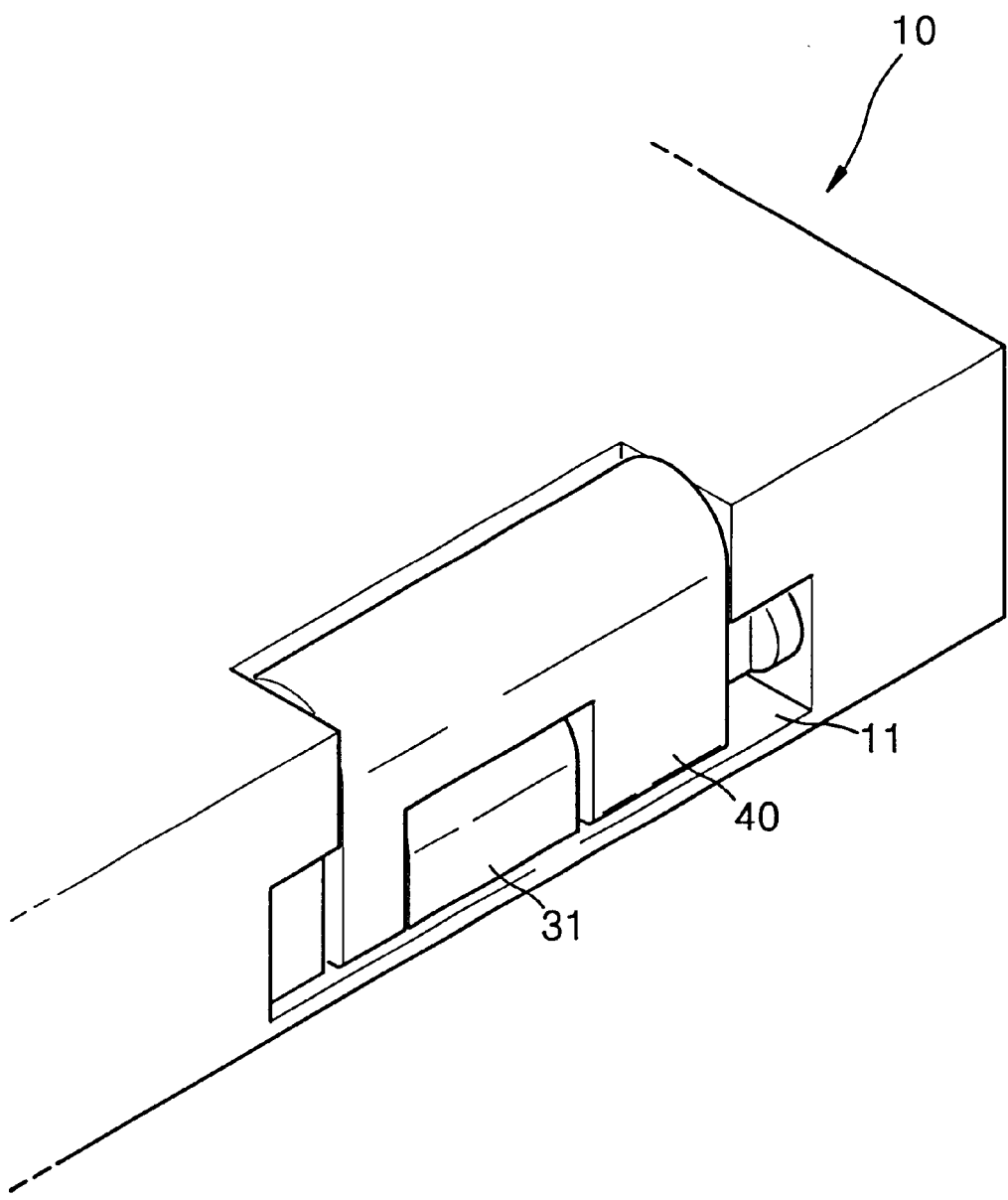
FIG. 7 is a partial perspective view illustrating a state in which a rotation bracket is positioned at a second position.

In this case, the rotation brackets 15 and 15' covered by the case 40 are positioned at the first position orthogonal to the top surface 10a of the body 10. In this state, in the case where the body 10 is intended to be carried or stored, the protruding rotation brackets 15 and 15' may be damaged. Also, the light emitting module 31 is exposed outwardly to be susceptible to damage by foreign matter. Also, a user may be directly exposed to the light emitted from the light emitting module 31, which may be detrimental to user safety. Thus, it is necessary for the rotation brackets 15 and 15' to be safely secured within the receiving portion 11. To this end, as shown in FIG. 6, the rotation bracket 15 is pushed away in a direction indicated by 'A' together with the case 40. Then, the position fixing holes 15a and the corresponding position fixing pins 13a are separated from each other. Next, the rotation bracket 15 is rotated by 180° in a direction indicated by 'B'. Then, as shown in FIG. 7, the rotation bracket 15, the case 40 and the light emitting module 31 are safely secured in the receiving portion 11. In this state, if the user's hand is taken off of the case 40 containing the rotation bracket 15, the rotation bracket 15 is restored to its original position by the restoring force of the spring (14 of FIG. 3). Then, the position fixing holes 15a and the corresponding position fixing pins 13a are again connected to each other. Thus, the rotation bracket 15a, the light emitting module 31 and the case 40 are fixed in a state where they are inserted into the receiving portion 11. As described above, if the rotation bracket 15 and the light emitting module 31 and the case 40 are inserted into the receiving portion 11, the outer appearance of the body 10 is simplified. Also, since the light emitting module 31 does not protrude from the body 10, it can be protected from being damaged. Still further, even if light is emitted from the light emitting module 31, the user is not directly exposed to the light, thereby ensuring user safety.

In the case where the display member 20 is intended to be mounted on the body 10, the operation is performed in the reverse order to that described above. In other words, the rotation bracket 15 is pushed away in one side, and then rotated to reach the first position. Then, if the user's hand is taken off of the rotation bracket 15, the position of the rotation bracket 15 is fixed by the position fixing mechanism. In this state, if the engagement bracket 23 is coupled to the hinge bracket 17, the display member 20 is rotatably mounted on the body 10.

Figure 8:
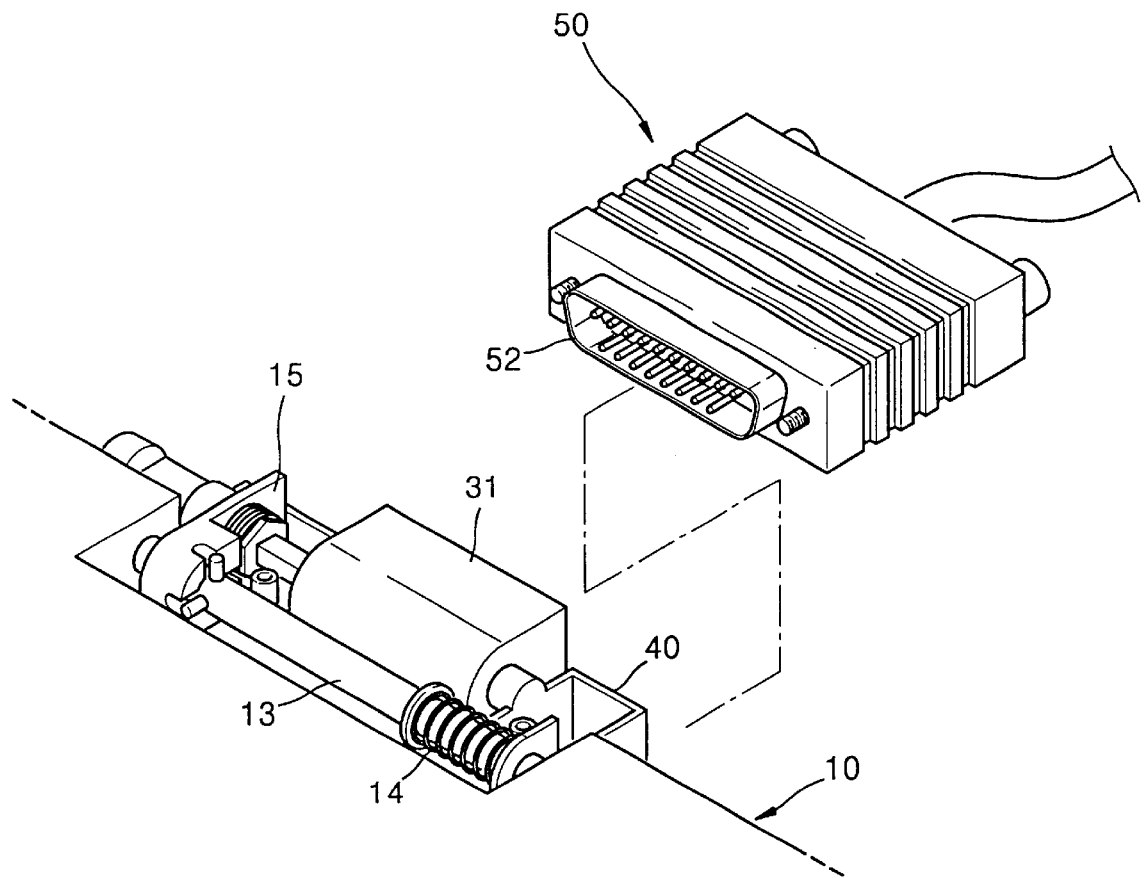
FIG. 8 is a perspective view illustrating a state in which a rotation bracket is positioned at a horizontal position and a connector is connected to a receiving portion.

Now, connection of the body 10 and the display member 20 for signal transmission therebetween will be described. In this case, the light emitting module 31 and the rotation bracket 15 are positioned, as shown in FIG. 8. In other words, the light emitting module 31 and the rotation bracket 15 are rotated by about 90° from the first position. Then, the light emitting module 31 is level with the top surface 10a of the body 10. In this state, a fetching terminal 52 of the connector 50 whose one end is connected to the display member 20 is inserted into the receiving portion 11. Then, the transmission terminal (12 of FIG. 5) and the fetching terminal 52 are connected and signal transmission is allowed between the body 10 and the display member 20. Also, although not shown in the drawing, when the light emitting module 31 is level with the top surface 10a of the body 10, a separate optical connector having a predetermined light receiving module corresponding to the light emitting module 31 may be connected to the light emitting module 31.

In the above-described display connector of an electronic device according to the present invention, a display member can be detachably mounted on a body.

Also, in a state in which the display member is disconnected from the body, rotation brackets and a light emitting module can be safely secured in a receiving portion. Thus, the outer appearance of the body can be simplified and the light emitting module can be protected from being damaged. Also, a user can be protected from light emitted from the light emitting module.

Further, since a transmission terminal is provided in the receiving portion, the body and the display member spaced apart from the body can be connected to allow signal transmission therebetween.

It is contemplated that numerous modifications may be made to the display connector for electronic device of the present invention without departing from the spirit and scope of the invention as defined in the following claims.

What is claimed is:

1. A display connector comprising:

a body having at one end a receiving portion with a predetermined depth and having input keys on a top surface;

a display member for receiving a picture signal from the body and displaying an image;

a rotation bracket rotatably and slidably installed inside the receiving portion, and rotating between a first position at which the rotation bracket protrudes to the top surface of the body during rotation and a second position at which the rotation bracket is accommodated inside the receiving portion;

a hinge pin which is rotatably coupled to the rotation bracket and to which the display member is detachably connected when the rotation bracket is positioned at the first position;

a position fixing mechanism which fixes the position of the rotation bracket;

a light emitting module supported by the rotation bracket to be rotated with the hinge pin, and having a laser diode array for independently irradiating light according to a driving signal; and a light receiving module installed in the display member to be locked to face the light emitting module when the display member is mounted on the body, and having a photodiode array for independently performing a photoelectric conversion on incident light, wherein the display member is detachably installed with respect to the hinge pin so as to open or close the top surface of the body when the rotation bracket is positioned at the first position, and the rotation bracket is rotated to reach the second position when the display member is disconnected from the body.

2. The display connector according to claim 1, further comprising a support shaft, which is installed inside the receiving portion, for rotatably and slidably supporting the rotation bracket.

3. The display connector according to claim 2, wherein the position fixing mechanism comprises:

at least one position fixing pin protruding from an outer circumference of the support shaft and operative to be locked to a position fixing hole formed in the rotation bracket when the rotation bracket is positioned at the first and second positions; and a spring installed on the support shaft, and maintaining a locked state of the position fixing pin and the position fixing hole by elastically pressing the rotation bracket.

4. The display connector according to claim 3, wherein at least three of the position fixing holes are formed at intervals of 90° with respect to each other, and the rotation bracket is fixed in the middle of the first and second positions so that the rotation bracket is level with the top surface of the body.

5. The display connector according to claim 1, wherein a connection portion for accommodating the rotation bracket and the light emitting module is recessed at one end of the display member in a predetermined shape, and the display connector further comprises:

an engagement bracket fixed inside the connection portion and rotating in engagement with the hinge pin;

a locking mechanism with maintains connection of the engagement bracket and the hinge pin; and an unlocking mechanism installed in the display member, which unlocks the locking mechanism.

6. The display connector according to claim 1, wherein a transmission terminal corresponding to an input terminal of a connector for connecting a remote display member, is provided within the receiving portion.

7. The display connector according to claim 1, further comprising a case installed to cover the rotation bracket and the position fixing mechanism, and rotating along with the rotation bracket.

8. The display connector according to claim 7, wherein one end of the light emitting module is rotatably coupled to the case and the other end thereof is coupled to the hinge pin so as to be constricted to rotate with the rotating hinge pin.

* * * * *